United States Patent [19]

Budyko et al.

[11] Patent Number: 4,885,654

[45] Date of Patent: Dec. 5, 1989

[54] DEVICE FOR ARCLESS SWITCHING OF ELECTRICAL CIRCUITS

[76] Inventors: Viktor A. Budyko, ulitsa Mira, 20,kv. 60; Andrei F. Ivanchenko, Angolenko, 14a,kv.17; Vladimir M. Krokhmal, Lenina, 58, kv.15; Vladimir V. Konovalenko, Vodonapornaya, 16a; Georgy V. Nechvolodov, Avramenko, 12,kv.8; Boris N. Lastochkin, Lenina,58, kv.4; Valentin D. Kutsov, Kedrovaya,67, all of Zaporozhie, U.S.S.R.

[21] Appl. No.: 241,979

[22] PCT Filed: Nov. 28, 1986

[86] PCT No.: PCT/SU86/00122

§ 371 Date: Jun. 29, 1988

§ 102(e) Date: Jun. 29, 1988

[87] PCT Pub. No.: WO88/04100

PCT Pub. Date: Jun. 2, 1988

[51] Int. Cl.⁴ .............................................. H02H 7/00

[52] U.S. Cl. .......................................... 361/13; 361/6; 361/8

[58] Field of Search .......................... 361/2, 5, 6, 8, 13

[56] References Cited

U.S. PATENT DOCUMENTS

| | | | |
|---|---|---|---|
| 3,539,775 | 11/1970 | Casson | 261/13 X |
| 3,868,549 | 2/1975 | Schaefer et al. | 361/6 |
| 4,438,472 | 3/1984 | Wasdworth | 361/2 X |
| 4,745,511 | 5/1988 | Kugelman et al. | 361/8 |

FOREIGN PATENT DOCUMENTS

| | | |
|---|---|---|
| 72566 | 1/1985 | European Pat. Off. . |
| 75341 | 8/1970 | Fed. Rep. of Germany . |
| 2613929 | 10/1977 | Fed. Rep. of Germany . |
| 2581239 | 10/1986 | France . |
| 590549 | 8/1977 | Switzerland . |
| 920898 | 4/1982 | U.S.S.R. . |
| 1107186 | 8/1984 | U.S.S.R. . |
| 1159077 | 5/1985 | U.S.S.R. . |

*Primary Examiner*—Derek S. Jennings
*Attorney, Agent, or Firm*—Burgess, Ryan & Wayne

[57] ABSTRACT

A device for arcless switching of electrical circuits, wherein power leads of a controlled semiconductor device - transistor 9 are connected parallel to a movable contact (2) and a fixed make contact (3) of a make-and-break contact assembly (1). A control lead of the transistor, which is its base, is connected to a resistor (11) and a fixed break contact (10) of the contact assembly (1), which are components of a control circuit. The movable contact (2) and the resistor (11) are connected to opposite poles of the supply source.

5 Claims, 1 Drawing Sheet

DEVICE FOR ARCLESS SWITCHING OF ELECTRICAL CIRCUITS

DESCRIPTION OF TECHNICAL FIELD

The invention relates to switching devices and, particularly, to a device for arcless switching of electrical circuits.

PRIOR ART

One of the promising trends in developing devices for arcless switching of electrical circuits is combining a mechanical contact and a controlled semiconductor device so that an additional, parallel path bypassing contacts for the switching current is provided. This combination retains the advantages of a controlled semiconductor device, which has high reliability, fast response, and a great number of switching cycles, and of a mechanical contact, which consists in low losses of the switching voltage. It also provides arcless switching of electrical circuits.

Conventionally, arcless switching devices comprise a make contact and a means for its protection, which can be made as a controlled semiconductor device connected parallel thereto and coupled to a control circuit. Further improvement of such devices are now focused on providing new control circuits.

At present, two groups of control circuits are employed: with and without a control input.

Known in the art is a switching device (SU, A, 1107186), comprising a controlled semiconductor device, a make contact of an electromagnetic relay being connected parallel to the power outputs of the semiconductor device and coupled to a supply source, a control output thereof is connected to a control circuit made up of a coil of the electromagnetic relay and a resistor whose connection point is the control input. The resistor is connected to one of the power outputs of the controlled semiconductor device, while the coil of the electromagnetic relay is coupled to a control output of the semiconductor device.

This switching device is deficient in that a control input provided in the circuit means the potential thereon is to be varied to control the operation of the device. This is impossible without some additional means, e.g. additional make contacts inserted into the supply source circuit. This, in turn, makes the device less reliable and more complicated. Since the coil of the electromagnetic relay is connected to the control output of the semiconductor device, current in the control circuit is limited and, therefore, saturation of the semiconductor device, which is necessary for arc extinction, becomes difficult and the speed of response is affected. In addition, the presence of the coil of the electromagnetic relay means that the device can only be used to protect contacts of electromagnetic relays.

Known in the art is a device for arcless switching (SU, A, 1159077), comprising a controlled semiconductor device whose power leads are coupled parallel to a make contact of a bistable electromagnetic relay having a memory and two control inputs, the control output of the semiconductor device being connected to a control circuit built around an OR element whose inputs are connected to control inputs of the bistable relay.

This device is deficient in that it has control inputs which also require control means generating on and off pulses, e.g. make contacts inserted in the supply source circuit. This makes the device less reliable and its circuitry more complicated, though the control built around an OR element has a higher speed of response as contrasted to the foregoing device. The use of a bistable relay means that the device can only be used to protect contacts of relays of this particular type.

To summarize, devices for arcless switching of electrical circuits, which are provided with a control input in their control circuits, are characterized by a higher speed of response but require additional means for generating control signals to be applied to these control inputs, and this makes the devices more complicated and less reliable. Besides, such devices have a narrow field of application and can be used only to protect contacts of electromagnetic relays.

The principal demand set to devices for arcless switching of electrical circuits is reliability and uncomplicated structure. The speed of response may be relatively low. It is essential that protection could be provided for contacts of toggle switches, buttons, and keyboards.

Known in the art is a device for arcless switching of electrical circuits (SU, A, 920898), comprising a controlled semiconductor device whose power leads are coupled parallel to movable and fixed contacts of a make contact connected to a supply source, while a control lead thereof is connected to a resistor and a capacitor of the control circuit. The resistor is connected to the supply source, while the capacitor is connected to one of the power outputs of the controlled semiconductor device. The latter is connected to the main make contacts via an additional make contact of the control circuit, the main and additional make contacts being coupled by devices controlling the sequence of their operation, while the movable contact of the main make contact and the resistor of the control circuit are connected to one pole of the supply source.

This device is deficient in that the additional make contact of the control circuit is connected to the power lead of the controlled semiconductor device and it is switched on without any delay, which results in substantial current surges through the additional make contact of the control circuit when the load is turned on, particularly capacitive loads of filament lamps. This is a serious drawback, because the reliability of additional make contacts of the control circuit is reduced and, consequently, the device itself becomes less reliable.

The device is made less reliable and more complicated because it comprises means controlling the sequence of operation of the make contact and the additional make contact of the control circuit. Make contacts used in the control circuit are very slow in operation and the speed of response of the device, therefore, becomes sluggish when the load is connected. Since no control input is provided in the control circuit, the field of application of the device is fairly wide, including new types of switching devices, because they can be used to protect not only contacts of electromagnetic relays, but also manually controlled switches, such as toggle switches, buttons, keyboards. However, the predetermined sequence of operation of the main and additional make contacts is a serious limitation of contact protection in each type of switching devices. It should also be mentioned that the device can only be used in DC circuits.

DISCLOSURE OF THE INVENTION

It is an object of this invention to provide a device for arcless switching of electrical circuits, which should be extremely reliable, fast and simple.

This object is achieved in that, in a device for arcless switching of electrical circuits, power leads of a semiconductor controlled device are connected in parallel to movable and fixed make contacts of a two-way contact set; a control lead of the controlled semiconductor device is connected to a resistor and a fixed break contact of the two-way contact set, which are components of the control circuit; the movable contact and the resistor are connected to opposite poles of the supply source.

Arcless switching is provided due to the connection of the controlled semiconductor device, make-and-break contact set, and resistor according to the invention. Moreover, arcless switching is provided not only for the load circuit—the make contact, but for the control circuit—the break contact, which makes the device substantially more reliable.

Examination of mass produced switching devices demonstrated that the majority feature make-and-break contact assemblies and, consequently, known devices for arcless switching of electrical circuits make no use of the break contact. The use of the break contact makes the control circuit, and the device as a whole, uncomplicated.

The use of the break contact and resistor in the control circuit, according to the invention, provides a faster load connection, since the break contact is much faster in operation as compared to the make contact.

The use, according to the invention, of the make-and-break contact assembly and a resistor in the control circuit permits control of the semiconductor device through respective extreme and intermediate positions of the movable contact. Any switching device equipped with one make-and-break contact set can, therefore, be employed in the device according to the invention, which expands its field of application.

BRIEF DESCRIPTION OF THE DRAWINGS

The invention will now be described in greater detail, by way of example, with reference to the accompanying drawings wherein.

BEST MODE FOR CARRYING OUT THE INVENTION

Figure 1:
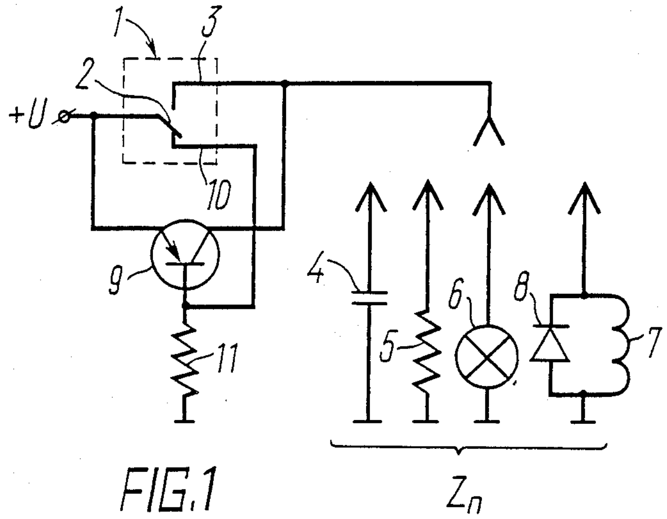
FIG. 1 shows a circuit diagram of a device for arcless switching of electrical DC circuits featuring various loads, according to the invention.

A device for arcless switching of DC electrical circuits comprises a make-and-break contact assembly 1 (FIG. 1) whose movable contact 2 is connected to a positive pole of a supply source U, while a fixed make contact 3 is connected to one of the loads; a capacitive load 4, a resistive load 5, a filament lamp 6, an inductive load 7 having a parallel-connected diode 8, or to several loads $Z_n$. These loads are grounded, as is the negative pole of the supply source. A controlled semiconductor device 9, which is a transistor, is connected parallel to the contacts 2 and 3. Its emitter is connected to the movable contact 2, while the collection is connected to the fixed contact 3. The base of the transistor 9 is connected to a control circuit built around a break contact 10 of the contact assembly 1 and a grounded resistor 11.

Figure 2:
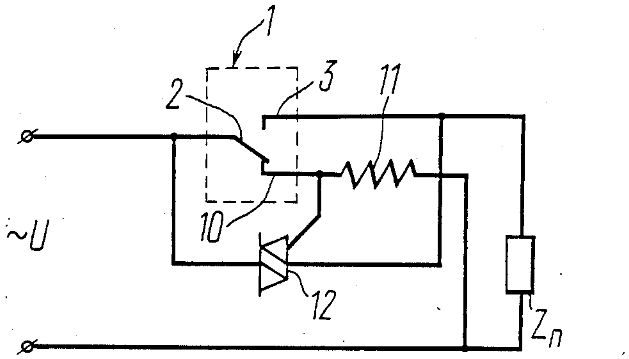
FIG. 2 shows a circuit diagram of FIG. 1 for AC circuits, according to the invention.

The device for arcless switching of AC electrical circuits comprises a make-and-break contact assembly 1 (FIG. 2) whose movable contact 2 is connected to a first pole of an AC supply source U, while a fixed make contact 3 is connected to the load $Z_n$ connected to the second pole of the AC supply source. A controlled semiconductor device which is a semistor 12 (silicone resistor) is connected parallel to the contacts 2 and 3, the cathode is connected to the movable contact 2, while the anode is connected to the fixed make contact 3. The control electrode of the semistor 12 is connected to the movable break contact 10 and resistor 11 which is connected to the second pole of the AC supply source.

The device for arcless switching of DC electrical circuits, according to the invention, operates as follows.

Initially, the transistor 9 (FIG. 1) is nonconductive and operates as a diode, since its emitter and base are shorted by contacts 2 and 10. No current is supplied to the load $Z_n$ through the contacts 2 and 3. The reverse current flowing through the emitter-collection junction of the nonconductive resistor 9 can be neglected. The device operates from the supply source via the circuit comprising the movable contact 2, the fixed break contact 10, and the resistor 11.

When cut in, the movable contact starts moving and its pressure on the fixed break contact 10 decreases, which results in an increase of the crosspath resistance of the contacts 2 and 10. The growing crosspath resistance of the contacts 2 and 10, added to the resistance of the resistor 11, ensure that the transistor 9 is saturated. After that, the contacts 2 and 10 separate and the baseemitter junction of the saturated transistor 9 prevents any spark and arc processes and field emission of electrons in the contact gap of the contacts 2 and 10, which makes them extremely reliable.

The load $Z_n$ is connected at a faster speed because in the process of separation of the contacts 2 and 10 the transistor 9 is saturated.

The transistor 9 provides an additional path for current to flow bypassing the contacts 2 and 3 for a time required for the movable contact 2 to cross the gap and meet the fixed make contact 3. At this stage, the capacitive load 4, which is distributed capacitance of long lines and cables, through which the resistive load 5 can be connected, starts charging and the lamp 6 starts heating. The difference of potentials between the movable contact 2 and the fixed make contact 3 becomes equal to the saturation voltage of the emitter-collector junction of the transistor 9, which is at all times lower than the arcing voltage (8–10 V). As the movable contact 2 meets the fixed contact 3, their contact pressure and, consequently, crosspath resistance change, which results in the voltage drop change and redistribution of current between the transistor 9 and contacts 2 and 3. When the voltage drop across contacts 2 and 3 becomes less than 0.5 V (for a silicon transistor), the transistor 9 becomes nonconductive, its collector characteristics are brought down to zero, and all current flows to the load $Z_n$ through the contacts 2 and 3.

In this manner, no arc processes and field emission of electrons occur when contacts 2 and 3 meet and separate, which makes the device extremely reliable when the load $Z_n$ is connected.

When the reverse process starts, the movable contact 2 starts moving and its pressure on the fixed make contact 3 decreases, which results in the increase of the crosspath resistance and the voltage drop across the contacts 2 and 3.

The transistor 9 is brought from a nonconductive state via an active state to a saturated state and redistributes current between itself and contacts 2 and 3. When the contacts 2 and 3 separate, the voltage across these contacts is equal to the saturation voltage of the collector-emitter junction of the transistor 9, which is at all times lower than the short arc voltage. For the time required for the contact 2 to cross the contact gap, current flows to the load $Z_n$ via the transistor 9. When the contacts 2 and 3 meet, the transistor 9 becomes nonconductive and the load is deenergized.

In this manner, no arc processes and field electron emission occur when contacts 2 and 3 meet and separate, which makes the device according to the invention extremely reliable when the load $Z_n$ is disconnected.

Power losses are caused by current consumption in the circuits comprising: movable contact 2—fixed contact 10—resistor 11; or the emitter-base junction of the transistor 9—resistor 11. To reduce these power losses, it is advisable that components of other circuits, which are constantly under voltage, be used or to employ a composite transistor where two transistors are connected in a Darlington circuit instead of the transistor 9.

The device for arcless switching of AC electrical circuits is similar to the above device, the only difference being that the load is deenergized not when the contacts 2 and 10 (FIG. 2) meet but when the AC voltage transits through zero when the semistor 12 becomes nonconductive while the contacts 2 and 10 remain closed.

Given below are examples of switching different loads by means of the disclosed device for arcless switching of electrical circuits.

EXAMPLE 1

When a capacitive load (20.0 mcF capacitor) was connected to a 24 V supply source, the switching current on the relay contacts was 12 A. When the herein disclosed device was used, the movable contact crossed the gap within approximately 2 microseconds. No switching current was evident between the make contacts, since the capacitive load was practically completely discharged through the transistor which was in a saturated state while the movable contact crossed the contact gap.

EXAMPLE 2

When a filament lamp was connected to a 26 V supply source (operational current of the lamp was 0.15 A), the switching current on the contacts was 1.2 A, which corresponds to a switching power of 31.2 watts (26 V×1.2 A).

When the herein disclosed device equipped with a silicon transistor and having time parameters described in Example 1 was used, the switching current was 0.46 A and, consequently, the switching power was 0.46 watts (1.0 V×0.46 A). This means that the device reduces the switching power on the contacts by a factor of about 67.

EXAMPLE 3

To switch a resistive load with a supply voltage of 30 V and current of 10 A, a golden-contact relay was used. The maximum switching current of these contacts was 0.5 A with a voltage not more than 15 V and a guaranteed number of switchings of 10,000. It should be born in mind that gold tends to form needles and weld contacts, and cannot, therefore, be used when the switching current exceeds 1 A. After 20,000 operations at a frequency of 5 Hz the crosspath resistance of make-and-break contacts in the eight contact assemblies of two relays remained unchanged. The relay was opened and no carbonization or other defects where found on the surface of the golden contacts.

INDUSTRIAL APPLICABILITY

The device for arcless switching of electrical circuits can be used to protect make contacts of switching contact assemblies of electromagnetic relays, toggle switches, and push buttons in DC and AC circuits for any type of load.

We claim:

1. A device for arcless switching of electrical circuits, comprising:

a power make contact having a movable contact and a fixed contact, said movable contact being connected to a first pole of a supply source and being a movable contact of a make-and-break contact assembly, said fixed contact being a fixed make contact of the make-and-break contact assembly;

a controlled semiconductor device having a control lead, and power leads connected in parallel with said movable and fixed contacts of said power make contact;

a control circuit including said movable contact of said power make contact, a fixed contact electrically coupled to said control lead of said controlled semiconductor device, and a resistor connected between said control lead of said controlled semiconductor device and a second pole of the supply source, said fixed contact of the control circuit being a fixed break contact of the make-and-break contact assembly, and the controlled semiconductor device being saturated in any intermediate position of the movable contact to shunt all contacts of the make-and-break contact assembly and to produce an additional parallel path, aside from the contacts of the make-and-break contact assembly, for switching current and control circuit current.

2. A device for arcless switching of electrical circuits, comprising:

a make-and-break contact assembly including a movable contact connected to a first pole of a supply source, a fixed make contact connected to a load, and a fixed break contact, said movable make contact being selectively connected with any one of said fixed contacts, a controlled semiconductor device having a control lead connected with said fixed break contact, and power leads connected in parallel with said movable make contact and said fixed make contact, a resistor connected between said control lead of said controlled semiconductor device and a second pole of the supply source, and the controlled semiconductor being saturated in any intermediate position of the movable make contact between said fixed contacts, to shunt all contacts of the make-and-break contact assembly and to produce an additional parallel path, aside from the contacts of the make-and-break contact assembly, for switching current and control current.

3. A device according to claim 2; wherein said controlled semiconductor is a transistor.

4. A device according to claim 3; wherein said transistor is a by pole or junction transistor having a collector and emitter which constitutes said power leads and a base which constitutes said control lead.

5. A device according to claim 2; wherein said controlled semiconductor device is a semistor having a cathode and an anode constituting said power leads and a control electrode constituting said control lead.

* * * * *